United States Patent
Nürnberg

(10) Patent No.: US 11,701,551 B2
(45) Date of Patent: Jul. 18, 2023

(54) ONE MATERIAL BALL

(71) Applicant: adidas AG, Herzogenaurach (DE)

(72) Inventor: Hans-Peter Nürnberg, Gutenstetten (DE)

(73) Assignee: adidas AG, Herzogenaurach (DE)

( * ) Notice: Subject to any disclaimer, the term of this patent is extended or adjusted under 35 U.S.C. 154(b) by 111 days.

(21) Appl. No.: 15/366,821

(22) Filed: Dec. 1, 2016

(65) Prior Publication Data

US 2017/0151470 A1 Jun. 1, 2017

(30) Foreign Application Priority Data

Dec. 1, 2015 (DE) ...................... 10 2015 223 885.7

(51) Int. Cl.
| | |
|---|---|
| A63B 41/04 | (2006.01) |
| A63B 45/00 | (2006.01) |
| A63B 41/00 | (2006.01) |
| B32B 1/00 | (2006.01) |
| B32B 5/24 | (2006.01) |

(Continued)

(52) U.S. Cl.
CPC .............. *A63B 41/04* (2013.01); *A63B 41/00* (2013.01); *A63B 45/00* (2013.01); *B32B 1/00* (2013.01); *B32B 3/18* (2013.01); *B32B 5/022* (2013.01); *B32B 5/245* (2013.01); *B32B 5/26* (2013.01); *A63B 2243/0025* (2013.01); *B32B 2260/021* (2013.01); *B32B 2260/046* (2013.01); *B32B 2262/0292* (2013.01); *B32B 2266/0278* (2013.01)

(58) Field of Classification Search
CPC . A63B 41/04; A63B 45/00; A63B 2243/0025; A63B 41/02; A63B 41/08; A63B 41/10; A63B 2209/18; A63B 2209/00
See application file for complete search history.

(56) References Cited

U.S. PATENT DOCUMENTS

| | | | |
|---|---|---|---|
| 2,623,747 A | 12/1952 | Crowley | |
| 5,181,717 A * | 1/1993 | Donntag | ................ A63B 41/08 264/257 |

(Continued)

FOREIGN PATENT DOCUMENTS

| | | |
|---|---|---|
| CN | 2304439 Y | 1/1999 |
| CN | 1741834 A | 3/2006 |

(Continued)

OTHER PUBLICATIONS

Computer-generated English Translation of Detailed Description and Claims for Japanese Patent Publication No. JP-S54-138737 A, published Oct. 27, 1979, 4 pages, retrieved from https://www4.j-platpat.inpit.go.jp/.

*Primary Examiner* — Steven B Wong
(74) *Attorney, Agent, or Firm* — Sterne, Kessler, Goldstein & Fox P.L.L.C.

(57) ABSTRACT

A ball includes a bladder that has a majority weight component of a material of a first material class. The ball includes at least one intermediate layer that is arranged exterior to the bladder and that has a majority weight component of the material of the first material class. The ball includes at least one exterior layer that is arranged exterior to the at least one intermediate layer and that has a majority weight component of the material of the first material class.

17 Claims, 2 Drawing Sheets

(51) Int. Cl.
   *B32B 5/26* (2006.01)
   *B32B 5/02* (2006.01)
   *B32B 3/18* (2006.01)

(56) References Cited

U.S. PATENT DOCUMENTS

| | | | | |
|---|---|---|---|---|
| 5,390,932 A * | 2/1995 | Russo, Sr. | | A63B 45/00 473/377 |
| 5,580,049 A | 12/1996 | Brantley | | |
| 5,772,545 A * | 6/1998 | Ou | | A63B 41/00 156/170 |
| 5,865,697 A * | 2/1999 | Molitor | | A63B 41/00 473/604 |
| 6,206,795 B1 * | 3/2001 | Ou | | A63B 41/08 473/599 |
| 6,306,054 B1 * | 10/2001 | Dobrounig | | A63B 41/08 473/599 |
| 6,348,018 B1 * | 2/2002 | Ou | | A63B 41/08 473/143 |
| 6,503,162 B1 * | 1/2003 | Shishido | | A63B 41/08 473/599 |
| 7,699,726 B2 | 4/2010 | Avis | | |
| 8,622,857 B2 * | 1/2014 | Lo | | A63B 41/04 473/604 |
| 8,777,787 B2 | 7/2014 | Raynak et al. | | |
| 10,905,919 B2 * | 2/2021 | Le | | A63B 37/02 |
| 2001/0004919 A1 | 6/2001 | Dobrounig | | |
| 2003/0064835 A1 * | 4/2003 | Ichikawa | | C08G 18/758 473/378 |
| 2004/0138010 A1 * | 7/2004 | Ichikawa | | A63B 37/12 473/378 |
| 2004/0144477 A1 * | 7/2004 | Taniguchi | | A63B 41/08 156/147 |
| 2006/0043632 A1 * | 3/2006 | Andersen | | B29C 45/14819 264/161 |
| 2006/0046880 A1 * | 3/2006 | Tang | | A63B 41/08 473/604 |
| 2006/0084536 A1 * | 4/2006 | Taniguchi | | A63B 41/00 473/605 |
| 2007/0178997 A1 * | 8/2007 | Chang | | A63B 41/02 473/603 |
| 2008/0051233 A1 * | 2/2008 | Nesbitt | | A63B 37/0031 473/602 |
| 2010/0087269 A1 * | 4/2010 | Snyder | | A63B 53/04 473/329 |
| 2010/0144470 A1 * | 6/2010 | Lin | | A63B 41/08 473/605 |
| 2012/0088614 A1 | 4/2012 | Bulfin | | |
| 2012/0231908 A1 * | 9/2012 | Fujikura | | A63B 41/08 473/607 |
| 2012/0258824 A1 | 10/2012 | Berggren et al. | | |
| 2012/0277044 A1 * | 11/2012 | Berggren | | A63B 41/08 473/607 |
| 2013/0184105 A1 | 7/2013 | Johnson | | |
| 2013/0320577 A1 * | 12/2013 | Ishii | | B29B 13/022 264/36.12 |
| 2013/0324324 A1 * | 12/2013 | Ishii | | B29D 99/0042 473/376 |
| 2014/0100067 A1 * | 4/2014 | Swiszcz | | A63B 41/08 473/603 |
| 2014/0179462 A1 * | 6/2014 | Ladd | | A63B 37/0062 473/376 |
| 2014/0182781 A1 | 7/2014 | Berggren et al. | | |
| 2015/0102521 A1 * | 4/2015 | Nagasawa | | A63B 45/00 264/241 |
| 2015/0196809 A1 * | 7/2015 | Sullivan | | A63B 37/0091 473/376 |
| 2015/0197617 A1 * | 7/2015 | Prissok | | C08J 9/35 521/137 |
| 2017/0050089 A1 * | 2/2017 | Olivares Velasco | | A63B 45/00 |
| 2017/0120497 A1 * | 5/2017 | Lin | | B29C 47/0045 |
| 2017/0334107 A1 * | 11/2017 | Bhargava | | B29C 44/445 |

FOREIGN PATENT DOCUMENTS

| | | |
|---|---|---|
| CN | 102076386 A | 5/2011 |
| CN | 103083875 A | 5/2013 |
| CN | 103781518 A | 5/2014 |
| DE | 197 58 546 C2 | 11/2003 |
| EP | 1 637 192 A1 | 3/2006 |
| EP | 2 193 908 A2 | 6/2010 |
| JP | S54-138737 A | 10/1979 |
| JP | 2008093040 A * | 4/2008 |
| TW | 201021881 A1 | 6/2010 |
| WO | WO 2010/133305 A1 | 11/2010 |

\* cited by examiner

ONE MATERIAL BALL

BACKGROUND OF THE INVENTION

Technical Field

The present invention relates to a ball, in particular a football (also referred to as a soccer ball), and a method for the manufacture and recycling of balls.

Background

Balls, in particular footballs (i.e., soccer balls), in general comprise several layers, such as a bladder, a layer for cushioning, and an exterior layer. While the bladder can usually be inflated through a valve, the cushioning layer primarily serves for cushioning impact forces when the ball is kicked or bounces. It also has an influence on the rebound properties of the ball. On the one hand, the exterior layer serves for protecting the underlying layers, and on the other hand, for providing the ball with design features, such as graphic elements.

For achieving a ball as described above, the respective components are usually made of different materials. Said components are then bonded in a suitable manner, for example, by sewing, gluing, or welding.

U.S. Pat. No. 5,580,049 describes a ball (e.g., a soccer ball) comprising an interior inflatable bladder, a cover outside the bladder, and a liner between the bladder and the cover. The bladder may usually consist of rubber or latex, but also of polyurethane. The liner may be made of a polyvinyl chloride (PVC) yarn, whereas the cover comprises polyurethane. The components may be sewn together.

U.S. Pat. No. 8,777,787 B2 relates to a ball comprising several layers, namely a bladder, an intermediate layer, and a cover. The materials for the cover may be, for example, leather or polyurethane, but also PVC. For the intermediate layer, a polymer foam material should be used. The bladder may consist of a rubber or latex material.

Furthermore, reference is made to U.S. Pat. No. 7,699,726 B2, which also describes a ball. It comprises a cover, a foam layer, a latex layer, a textile layer, and a bladder. As materials for the cover, leather, polyurethane, or PVC are mentioned, for example. The foam layer may comprise polyolefin foams, and the bladder may comprise rubber or polyurethane. The respective components are then bonded together.

Manufacturing the respective components of a ball or the corresponding materials, however, requires a remarkable amount of energy (e.g., electricity, heat, etc.), which leads to considerable greenhouse gas emissions. Apart from that, for manufacturing balls with known procedures, adhesives are used, which constitutes an additional burden on the environment. Moreover, considerable efforts are necessary for reliably taking apart the ball at the end of its lifetime (for example, when it is broken due to excess strain or material fatigue). In this respect, particular attention is to be paid to the respective components or materials in order to optimize their disposal under environmental aspects. Energy is required for this as well in order to take the ball apart. This once again leads to greenhouse gas emission. However, on the other hand, many balls nevertheless end up in a garbage dump or in a waste incineration plant. In the past, too little attention was paid to this increasing problem.

Thus, it can be considered an underlying object of the present invention to provide an approach for limiting resource consumption and for limiting greenhouse gas emissions during the life cycle of a ball.

SUMMARY OF THE INVENTION

This problem is at least partially solved by a ball, in particular a football, that includes a bladder that has a majority weight component of a material of a first material class. In some embodiments, the ball further includes at least one intermediate layer arranged exterior to the bladder. In some embodiments, the at least one intermediate layer has a majority weight component of the material of the first material class. In some embodiments, the ball further includes at least one exterior layer arranged exterior to the at least one intermediate layer. In some embodiments, the at least one exterior layer has a majority weight component of the material of the first material class.

By providing a ball with several layers, whose respective majority weight component—or even the entire respective weight—is made of a material of the same material class, the material can be easily recovered from the ball, which significantly reduces the effort for separating and/or sorting the individual components. For example, the ball can be processed in one single recycling step. Balls according to the present invention can therefore significantly simplify recycling of used balls, especially if the entire ball, which comprises several layers, is made of a material of one single material class. Using one material of the same material class for different layers of a ball and providing a ball of excellent quality, which meets all requirements, including the professional ones, is enabled by the knowledge that different (physical and chemical) forms (e.g., yarn, foil, foam, particles, etc.) of a material of the same chemical material class (e.g., thermoplastic polyurethane (TPU), PVC, or polyethylene (PE)) may be used in order to provide the different properties required for manufacturing such a ball (e.g., form stability, resilience, moisture repellence, flight behavior, rebound properties, visual appearance, etc.). In particular, use of a thermoplastic material (e.g., TPU) for all components of the ball enables manufacturing a high-quality ball for athletes, which is easily and efficiently recyclable after use and thus contributes to reducing energy consumption and greenhouse gas emissions.

It is also possible that the ball comprises less than three layers, wherein in turn all used layers have a majority weight component of a material of the same material class. For example, this can be a ball which does not have a bladder. A ball may also be made of a bladder and a cover, or comprise a structured bladder and a cover.

By using a material of the same material class in a bladder, at least one intermediate layer, and at least one exterior layer, it is possible to use compatible materials that can be easily bonded, for example by applying energy or heat (e.g., by welding). In one embodiment, infrared radiant heat may be used for heating two surfaces such that they melt together. This way, it is not necessary to use a glue, which reduces the impact on the environment. Moreover, a chemical bond (e.g., by means of an adhesive originating from the same material class as the other components of the ball according to the invention) may be created between the layers, for example, by means of a chemical bond of the molecules.

It is also conceivable that two components of the ball may be bonded without an adhesive, for example by applying energy. This way, an at least partially closed material cycle can be ensured for numerous generations of balls, as the same base material can be recovered and reused for manufacturing further balls. For each new generation of balls made of the recycled material, energy and greenhouse gas emissions can be reduced, which would otherwise arise in the case of separation or destruction. Compared to a conventional ball, energy is saved as well, as existing components may be reused. Even when considering the energy required for the recycling and new manufacture of a new ball, the influence on the environment by the ball manufactured this way is considerably lower than in the case of a conventional ball made of newly produced and different components.

An at least partially closed material cycle means that it is also possible to mix reused base material with newly manufactured material of the same material class. In this process, the reused material (also referred to as "recyclate") may be added to the newly manufactured and used material. For example, the proportion of newly manufactured material may lie within 10% to 50%, or 15% to 20%, to ensure consistent material properties.

At least one intermediate layer may be arranged as a cushioning layer. If at least one cushioning layer is provided, the underlying bladder, which may be air-inflated, may be better protected from impacts and other potentially detrimental influences. This way, the lifetime and stability of the ball may be significantly improved.

Furthermore, the at least one intermediate layer may be made of panels. An exemplary process for manufacturing such panels is disclosed in DE 10 2015 209 797.8. Providing an intermediate layer as a panel allows simplified manufacturing, as several parts are bonded by suitable measures this way. It is therefore not necessary to manufacture an individual layer around an underlying layer. More energy can be saved by the simplified manufacturing thus achieved.

The material class used for the ball may be one of TPU, PVC, PE, polyamide (PA), or polypropylene (PP). Comprehensive tests have shown that especially the mentioned materials or material classes are suitable for manufacturing different components of a ball (i.e., the bladder, at least one intermediate layer, and at least one exterior layer). In this respect, TPU, depending on how it is processed, has many advantageous properties that optimally complement each other.

Moreover, it is provided that the majority weight component of the material of the first material class is more than 70% or more than 80% or more than 90% or more than 95% of the weight component of the material of the first material class at the respective component of the ball. In other examples, the bladder, the at least one intermediate layer, and/or the at least one exterior layer basically consist of a material of the same material class. The term "basically" here means that it is possible to work within the scope of tolerances that are common in this technical field.

At least one intermediate layer may comprise randomly arranged particles, for example, according to the so-called boost technology. Moreover, it is conceivable that the randomly arranged particles comprise expanded material. In particular, the particles of expanded material may comprise expanded thermoplastic polyurethane (eTPU). As an example, reference is made to DE 10 2015 209 795.1. A technology wherein at least one intermediate layer, such as a cushioning layer, is made of the mentioned particles, has particularly advantageous properties. For example, due to their properties, the randomly arranged particles result in particularly well-cushioned balls, whereby negative effects on the underlying bladder may be somewhat mitigated. Furthermore, by the particular characteristics of this arrangement of the base material, particularly good rebound properties may be achieved.

Moreover, the at least one intermediate layer may be made of a TPU yarn. Using a yarn allows manufacturing an intermediate layer for a ball in a simple manner. The yarn may be wrapped around the underlying layer in a desired form and bonded to it by means of suitable methods.

Furthermore, the ball may comprise at least one protection layer, wherein the at least one protection layer is arranged between the bladder and the at least one intermediate layer. The at least one protection layer is made of the material of the first material class. For example, the at least one protection layer may be made of a thermoplastic base material. By means of a specifically provided protection layer, the components of the ball may be particularly effectively protected from different external influences, such as force impacts, heat, or moisture.

The at least one protection layer may be provided as a plurality of parts. For example, the individual parts may be polygons, for example, rhombus-shaped elements. This way, it is possible to assemble a ball from few individual components, which may preferably originate from a recycled ball.

It is also possible that the at least one protection layer comprises a non-woven fabric. By means of a non-woven material, the protection of the bladder of the ball may be further improved. Thus, the entire lifetime of the ball may be extended, whereby the effects on the environment may be reduced.

In one embodiment, the at least one exterior layer may be arranged as a foil. Thus, the exterior layer offers protection for all underlying layers, such as the at least one intermediate layer and the bladder. Above all, the foil may protect the underlying layers from moisture, but it may also be arranged (e.g., reinforced) such that it offers protection against abrasion or other types of wear and tear. Alternatively or additionally, the exterior layer may also fulfill a design function, for example by suitable color pigments being added or design elements being printed. In any case, the material for the exterior layer (or the foil) originates from the same material class as the other layers, so that simple and environmentally friendly reuse is ensured.

It should be noted that the bladder may also comprise a fiber-reinforced TPU matrix with TPU fibers. Reference is made to DE 10 2015 209 800.1 for an example of manufacturing such a material. Provision as a fiber-reinforced matrix may result in improved stability and thus improved lifetime of the bladder. As the base material here is the same as for the other layers, particularly environmentally compatible reuse of this component of the ball is enabled in this case as well. The term "bladder" in the present invention also includes three-dimensional structures which do not have to be filled with air by inflation (e.g., through a valve), as described in aforementioned DE 10 2015 209 800.1.

The ball may also comprise a bladder arranged as a lattice structure, which comprises a plurality of lattice cells that comprise radially extending elements. This aspect of providing a bladder may also improve its properties, particularly with respect to the lifetime and reusability. For example, a structure as disclosed in DE 10 2015 209 811.7 may be used.

As an alternative to TPU, the first base material for the components of the ball may be PVC or PE. For example, it is possible to use both ether-based TPU and ester-based TPU. Moreover, PP or PA also come into consideration as materials. Similar to TPU, these materials allow manufacturing different layers or the bladder of a ball, so that they may be easily reused.

It is further advantageous if the first base material is arranged so as to be recycled in a joint recycling process for the bladder, the at least one intermediate layer, and the exterior layer, so that the first base material is usable as first base material for the manufacture of another bladder, at least one intermediate layer, and/or exterior layer. An important aspect of the present invention relates to reuse (recycling) of at least parts of a ball for manufacturing another ball. For example, it is possible to avoid new manufacture of these components—which involves considerable energy expenditure, resource consumption, and greenhouse gas emission. Furthermore, it is not necessary to dismantle the ball. The entire ball may be processed in one joint recycling process to recover the base material. The recycled material may serve as base material for another ball, but also for a different sporting article (e.g., shoes or shin guards). Basically, the recycled material may also serve as base material for manufacturing any other sporting article. Accordingly, a ball may comprise parts which have been recycled from another ball, which was previously manufactured as described herein.

The present invention also relates to a method for the manufacture of a ball according to one of the aspects described herein. In particular, the method for the manufacture may comprise recycling another ball.

Moreover, the present invention also relates to a method for recycling a ball as described herein.

According to another aspect of the present invention, a ball may be offered to a customer as described herein. After the ball has been used by the customer, e.g., after the life cycle of the ball, the manufacturer may take back the ball. Suitable return stations may be provided, for example, in stores, parks, venues, stadiums, or during sports events or other major events and/or the customer has the possibility to send the ball back to the manufacturer. The manufacturer may then recover the base material from the ball and use at least a part of it for manufacturing a new ball that comprises the recycled base material. It is also possible to use the recycled material for the manufacture of any sporting article (other than a ball), e.g., shoes, shin guards, etc., as was already explained above. According to different examples, vouchers or discounts may be provided for a new ball to offer customers an incentive to return the used balls or items to the manufacturer for recycling. It is also conceivable to develop a rental model, wherein the customer is charged a regular (e.g., monthly or annual) rental fee and wherein they receive a new ball when returning the old ball. The frequency at which a new ball is provided may depend on the type of ball and/or use behavior of the user (e.g., private user or sports club). This way, the required replacement frequency may be lower for an individual athlete than for a sports club. Another option is a subscription model, wherein the customer receives a replacement as soon as a new ball model is released.

According to another aspect of the present invention, the customer may purchase the sports equipment at the place where they want to do sports. For example, it may be useful to install a corresponding vending machine on a sports ground and/or a park area and/or to set up a point of sale providing or offering various balls according to the present invention. The customer could then make a deposit for using the ball. After use, the customer could then return the ball and receive back the deposit. In the alternative, they could also receive a discount for purchasing or renting another sporting article. As soon as the ball is no longer usable after a certain period of time, the manufacturer can directly initiate the steps necessary for recycling the ball and manufacture a new ball based on at least a part of the components of the old ball. This approach is particularly advantageous, as the balls that are no longer usable are not at a customer's home but directly at the manufacturer, who can take care of recycling as described herein as soon as necessary. This way, efficient as possible recycling is provided, which additionally avoids or reduces unnecessary energy consumption or greenhouse gas emission.

According to another aspect, a marker, for example a radio frequency identification (RFID) or an infrared (IR) marker may be used, e.g., a near infrared (NIR) marker in the ball according to the invention. The marker could indicate how many times the base material of the ball was used in other balls. This way, the customer can directly see how many life cycles the base material has already been through. Moreover, the marker could also indicate the subscription status of the customer. This would enable fully automated return and replacement of the ball. A marker could also be incorporated into the ball material to make it identifiable from a plurality of other materials. For example, it is possible to incorporate IR markers into a yarn or another component of the ball.

It should be noted that the different aspects described herein may also be used in sporting articles other than balls.

BRIEF DESCRIPTION OF THE FIGURES

Possible embodiments of the present invention are described in the following detailed description with reference to the following Figures, wherein.

DETAILED DESCRIPTION OF POSSIBLE EMBODIMENTS

It should be noted that only some possible embodiments of the present invention are described in detail below. However, the person skilled in the art will recognize that the specific details explained with respect to a particular embodiment may be modified, developed, combined in a different manner, or otherwise varied or omitted. Furthermore, it should be noted that different aspects of the following embodiments may be combined with aspects from the above summary of the invention.

Figure 1:
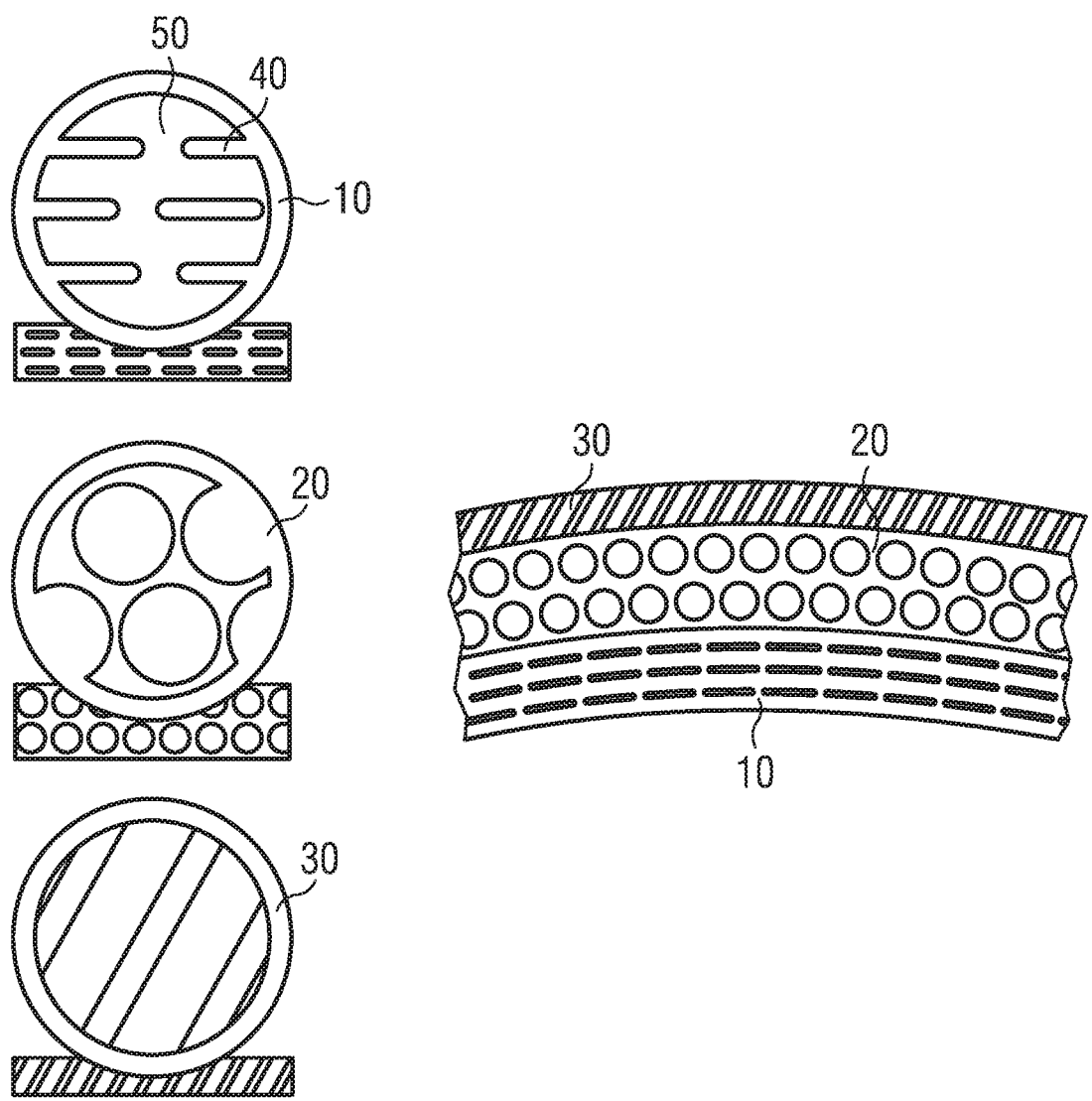
FIG. 1 shows the schematic structure of a ball according to an embodiment of the present invention.

First of all, FIG. 1 shows a part of a bladder 10. In one embodiment, the bladder 10 may be a TPU matrix 50 reinforced with TPU fibers 40. A method for manufacturing a suitable material is described in DE 10 2015 209 800.1. A bladder 10, which is based on such a fiber-reinforced matrix reinforced with internal material, can also be referred to as three-dimensional. A corresponding method for manufacturing a three-dimensional composite article, particularly a bladder 10 for a ball, can comprise the following steps: (a.) providing a rotatable mold; (b.) filling a first material into the mold; (c.) filling a second material into the mold, with at least one of the materials being a polymer material; (d.) moving the mold; and (e.) adapting at least one method parameter while performing one or several of the preceding steps so as to achieve a homogeneous distribution of the second material in the manufactured composite article. In this respect, each of the two mentioned materials is based on the same base material (e.g., TPU, PVC, PP, PA, or PE).

If the filled-in polymer material is a thermoplastic material (e.g., TPU), the filled-in material is preferably heated and/or cooled. Said material melts when heated and thus forms the carrier or matrix material. The second material, for example, may be fibers (e.g., TPU fibers), which are embedded in the first carrier material after rotational molding or extensively adhere to its surface.

In another embodiment, the bladder 10 may also be formed by a TPU structure. A corresponding method of manufacturing is disclosed in DE 10 2015 209 811.7. In this respect, a bladder 10 may comprise a surface layer comprising a plurality of panels, as well as a lattice structure extending below the surface layer. The lattice structure comprises a plurality of lattice cells comprising radially extending elements. At least the lattice cells arranged adjacent to the surface layer at least have a dimension smaller than the average diameter of the panels. This way the bladder 10 or the ball may be provided with homogeneous resilience and stability, like an inflatable bladder 10. Consequently, the bladder 10 thus manufactured is not a conventional inflatable bladder but a lattice structure. The structure thus manufactured can be made of a base material such as TPU, PVC, PP, PA, or PE.

Moreover, in the embodiment shown in FIG. 1, a first intermediate layer 20 is arranged. The intermediate layer 20 may be arranged as a cushioning layer. In one embodiment, this cushioning layer may be made of TPU foam. In another embodiment, this cushioning layer may also be made of TPU yarn.

Figure 2:
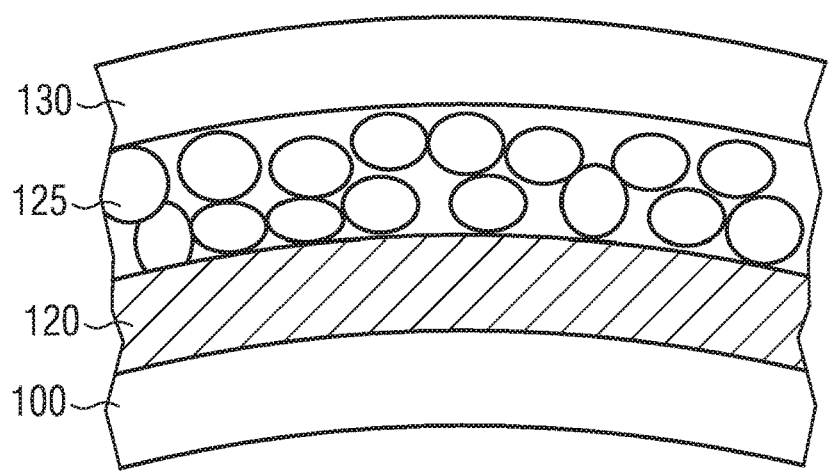
FIG. 2 shows a detailed structure of the layers of a ball according to an embodiment of the present invention.

With reference to FIG. 2, an embodiment is described wherein the bladder 100 does not comprise a TPU matrix reinforced with TPU fibers. In this embodiment, an intermediate layer 120 may be arranged above the bladder 100. This intermediate layer 120 may be arranged as a protection layer. In one embodiment, the protection layer may be made of a non-woven fabric and laminated onto the bladder 100. In one embodiment, the non-woven fabric may be made of rhombus-shaped pieces (e.g., two strip layers as a cover for the bladder 100). A ball may comprise as further layers a cushioning layer 125 (e.g., of eTPU or other materials mentioned herein) and an exterior layer 130, as described herein.

Figure 3:
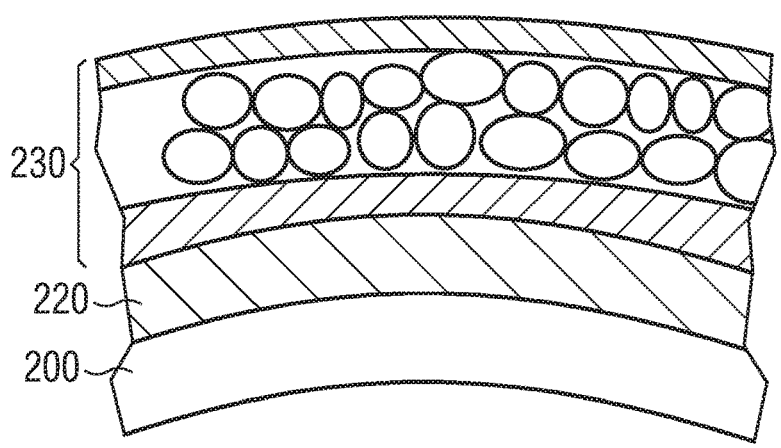
FIG. 3 shows a detailed structure of the layers of a ball according to an embodiment of the present invention.

In one embodiment, the cushioning layer 125 and the exterior layer 130 may be replaced by a single layer 230. In this case, said single layer may be arranged as integral foam. This is explained with reference to FIG. 3. There, the bladder 200 and the layers arranged as the cushioning layer 220 are provided as described above with reference to FIG. 2. In contrast to FIG. 2, however, the intermediate layer arranged as the cushioning layer 125 and the exterior layer 130 are replaced by integral foam 230. Said integral foam 230 offers cushioning properties and abrasion protection in one single element.

Figure 4:
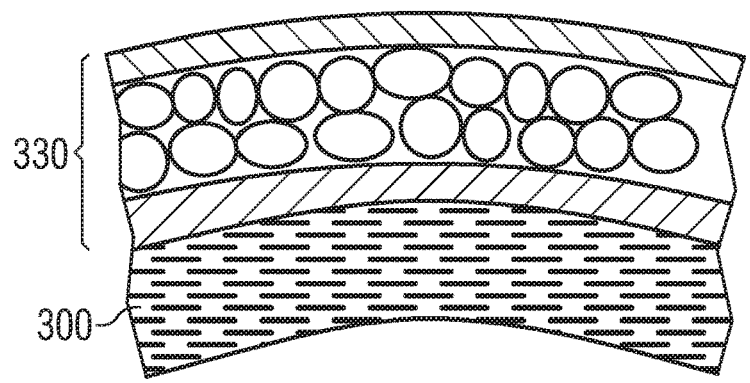
FIG. 4 shows a detailed structure of the layers of a ball according to an embodiment of the present invention.

In one embodiment, the integral foam layer may also be combined with a composite bladder 300. This is also schematically represented in FIG. 4. There, the layer 330 arranged as integral foam above is directly arranged on the composite bladder 300. Integral foam, as used herein, may be manufactured with a so-called "MuCell procedure," for example.

In all cases, the cushioning layer may be provided as a plurality of panels. A possible method for manufacturing such panels is disclosed in DE 10 2015 209 797.8, for example. In one embodiment, the method for manufacturing a panel comprises providing a carrier material having an outer side and an inner side within a mold having at least one first and one second mold part. On the outer side of the carrier material an outer layer of the panel is three-dimensionally molded within the mold. In addition, on the inner side of the carrier material an inner layer of the panel is three-dimensionally molded using at least the first mold part. This method enables manufacturing three-dimensionally molded panels for a ball with a minimum number of manufacturing steps. Separately molding a plurality of elements and subsequently attaching the molded elements to each other is not necessary.

By integrally manufacturing the panel, this method can completely dispense with bonding agents, adhesives or the like. No separate adhesives need to be applied to join the individual layers of the panel. The materials used for the individual layers of the panel are compatible with each other and, according to some examples, may be joined solely by means of thermal and/or mechanical energy. Furthermore, it is also possible to join the used materials by means of chemical reactions. A bonding is enabled by affinity of the used materials. However, should it be advantageous for the panel to be manufactured, adhesives, bonding agents or the like may be used alternatively. For manufacturing such a panel, TPU, PVC, or PE may be used, for example.

In the embodiment shown in FIG. 1, an exterior layer 30 is further provided. Said exterior layer 30 may be arranged as an inlay or decoration element. If the exterior layer 30 is arranged as a protection layer, all underlying layers can be efficiently protected from environmental influences such as moisture or heat, but also from abrasion. Moreover, using the exterior layer 30 offers many possibilities for designing the ball without having to provide the underlying layers with a color component.

The present invention has been described above by way of exemplary embodiments. Accordingly, the present invention should not be limited by any of the above-described exemplary embodiments, but should be defined only in accordance with the following claims and their equivalences. Further, when a particular feature, structure, or characteristic is described in connection with an embodiment, it is submitted that it is within the knowledge of one skilled in the art to effect such feature, structure, or characteristic in connection with other embodiments whether or not explicitly described.

What is claimed is:

1. A ball, comprising:
   a bladder having a majority weight component of a material of a first material class;
   at least one intermediate layer arranged exterior to the bladder and having a majority weight component of the material of the first material class, the at least one intermediate layer comprising a plurality of panels made of randomly arranged particles of expanded material of the first material class; and
   at least one exterior layer arranged exterior to and disposed over the plurality of panels of the at least one intermediate layer and having a majority weight component of the material of the first material class,
   wherein the first material class is selected from a group consisting of thermoplastic polyurethane, polyvinyl chloride, polyethylene, polyamide, and polypropylene,
   wherein the material of the first material class comprises a mixture of reused material and newly manufactured material, and wherein 10% to 50% of the material of the first material class is newly manufactured material, and wherein the bladder, the intermediate layer, and the exterior layer are thermally bonded without an adhesive.

2. The ball of claim 1, wherein the at least one intermediate layer is arranged as a cushioning layer.

3. The ball of claim 1, wherein the majority weight component of the material of the first material class is more than 50% of each respective component of the ball.

4. The ball of claim 1, wherein the expanded material comprises expanded thermoplastic polyurethane.

5. The ball of claim 1, wherein the at least one intermediate layer comprises a thermoplastic polyurethane yarn.

6. The ball of claim 1, further comprising at least one protection layer arranged between the bladder and the at least one intermediate layer and made of the material of the first material class.

7. The ball of claim 6, wherein the at least one protection layer is provided as a plurality of parts.

8. The ball of claim 6, wherein the at least one protection layer comprises a non-woven fabric.

9. The ball of claim 1, wherein the at least one exterior layer comprises a foil.

10. The ball of claim 1, wherein the bladder comprises a fiber-reinforced thermoplastic polyurethane-matrix with thermoplastic polyurethane-fibers.

11. The ball of claim 1, wherein the bladder is arranged as a lattice structure comprising a plurality of lattice cells that comprise radially extending elements.

12. The ball of claim 1, wherein the first material class is polyvinyl chloride or polyethylene.

13. The ball of claim 1, wherein the material is arranged so as to be recycled in a joint recycling process for the bladder, the at least one intermediate layer, and the at least one exterior layer, so that the material is usable as material for manufacturing another bladder, at least one intermediate layer, or at least one exterior layer.

14. The ball of claim 1, wherein the material comprises parts that have been recycled from another ball according to claim 1.

15. A method for manufacturing a ball according to claim 1.

16. The method of claim 15, further comprising recycling another ball.

17. A method for recycling a ball according to claim 1.

* * * * *